United States Patent Office 2,957,767
Patented Oct. 25, 1960

2,957,767

SILVER HALIDE DISPERSIONS

Forrest V. Williams, Dayton, Ohio, assignor to Monsanto Chemical Company, St. Louis, Mo., a corporation of Delaware No Drawing. Filed Dec. 18, 1957, Ser. No. 703,502

11 Claims. (Cl. 96—114)

The present invention relates to dispersion of silver halides and more particularly provides aqueous dispersions of silver bromide of very fine grain size and increased sensitivity in photographic emulsions comprising the dispersions.

It is well known in the art to prepare silver halides for photographic purposes by effecting the double decomposition reaction leading thereto in the presence of a peptizing or dispersing agent in order to obtain fine grain size of the precipitated silver holide; and in prior art, there have been employed to this end such dispersing agents as cellulose methyl ether, diethanolamine cellulose acetate, polyvinyl pyridine, gum arabic, and other water-soluble natural resins, etc. General purpose dispersants, particularly those containing sulfonate and/or carboxylate groups, could be employed only with caution owing to the possibility of conversion to insoluble silver salts thereof. Obviously, also, there could not be employed as dispersant an agent which would react with the other customarily employed components of photographic emulsions.

Now I have found that very fine grain size and improved sensitivity of photographic silver halides can be attained by preparing the halides in the presence of a dispersing agent comprising an aliphatic mono-olefin-maleic anhydride copolymer consisting of the repeating unit.

$$-Z-CH-CH-$$
$$\phantom{-Z-}O=C\phantom{-}C=O$$
$$\phantom{-Z-CH-}X\phantom{---}Y$$

wherein Z is a bivalent alkylene radical of from 2 to 4 carbon atoms and X and Y are selected from the class consisting of the radicals —OH, —ONH$_4$, —NH$_2$ and alkali metal.

One class of presently useful copolymers includes salts of maleic acid-C$_2$-C$_4$ aliphatic, mono-olefin copolymers with ammonia or an alkali metal, e.g., the ammonium, potassium, sodium or lithium salts of ethylene-maleic acid or ethylene-isobutylene-maleic acid copolymer.

Another class of presently useful copolymers includes the mono- and diamides of the C$_2$-C$_4$ alkene-maleic acid copolymers. This class of copolymer consists of the repeating unit

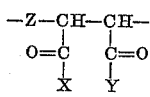

in which Z is as herein defined and T is selected from the class consisting of —NH$_2$ and —OH. As illustrative of copolymers having the above formula may be mentioned the mono-amide of maleic acid-ethylene, propylene or 1- or 2-butene copolymer, the diamide of maleic acid-ethylene or 2-butene copolymer, etc.

Still another class of the presently useful derivatives of maleic acid-C$_2$-C$_4$ aliphatic mono-olefin copolymers in-cludes half-ammonium salts, half-amides having the repeating unit

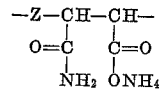

wherein Z is as herein defined. Representative members of this useful class include the ammonium salt of maleic acid-ethylene or propylene copolymer mono-amide, and the ammonium salt of maleic acid-1- or 2-butene copolymer.

A particularly useful class comprises the maleic acid-C$_2$-C$_3$ aliphatic mono-olefin copolymers having free carboxy radicals, i.e., copolymers consisting of the repeating unit

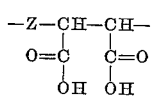

in which Z is as herein defined.

The above presently useful free acids, salts, amides, and half-salts-half-amides of maleic acid-C$_2$-C$_3$ aliphatic, mono-olefin copolymers are known materials which are obtainable in commerce or by methods well known to those skilled in the art. For convenience, however, a resume of such methods is given herewith.

In practice, the presently employed derivatives of maleic acid-olefin copolymers are prepared from readily available maleic anhydride-olefin copolymers. Generally, these copolymers are prepared by reacting ethylene, propylene, 1- or 2-butene or mixtures of these olefins with maleic anhydride in the presence of a peroxide catalyst in an aliphatic or aromatic hydrocarbon which is a solvent for the monomers but is a non-solvent for the interpolymer formed. Suitable solvents include benzene, toluene, xylene, chlorinated benzene, hexane, acetone and the like. While benzoyl peroxide is the preferred catalyst, other peroxides such as acetyl peroxide, butyryl peroxide, di-tert-butyl peroxide, lauroyl peroxide and the like are all satisfactory since they are soluble in organic solvents. The copolymer contains substantially equimolar quantities of the ethylene residue and the maleic anhydride residue. The properties of the copolymer such as molecular weight, for example, may be regulated by proper choice of the catalyst and control of one or more of the variables such as ratio of reactants, temperature, and catalyst concentration. For the present purpose, the salts of half-amides, half-salts or diamides of the C$_2$-C$_4$ aliphatic mono-olefin-maleic acid copolymers prepared from the corresponding alkene-maleic anhydride copolymers are generally useful, i.e., either the high or low-molecular weight copolymers are useful. Thus, the degree of polymerization may be from, say, 2 to 2,000, corresponding to an average molecular weight of, say, 250 to 250,000. Particularly useful are copolymers having an average molecular weight of, say, 600 to 200,000. The anhydride copolymer product is obtained in solid form and is easily recovered by filtration, centrifugation or the like. Removal of any residual or adherent solvent may be effected by evaporation using moderate heating.

The maleic anhydride copolymers thus obtained have the formula

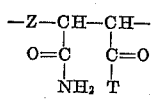

where Z corresponds to an alkylene radical having the carbon content of the olefin monomer which was used and n denotes the degree of polymerization.

Said anhydride copolymers are readily hydrolyzed by heating with water to yield the acid form of the copolymer:

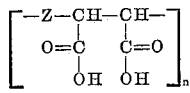

The mono- or diammonium or alkali metal salts may be readily obtained by reacting the copolymer in its anhydride or acid form with the stoichiometric amount of ammonium hydroxide or alkali metal hydroxide. Mixed salts, e.g., half-ammonium, half-alkali metal salts are prepared by first reacting with a quantity of ammonium hydroxide calculated to give the partial ammonium salt and then reacting the residual free carboxy radical with sufficient alkali metal hydroxide to neutralize said radical.

Amides are prepared generally by reacting the finely divided maleic anhydride-$C_2$-$C_4$ olefin copolymer with ammonia gas at ordinary or elevated temperatures. Half-salts, half-amides are formed by operating in the presence of the stoichiometrically required quantity of moisture. Heat is generally liberated in the preparation of the half-ammonium salt, half-amide, and it is thus desirable to provide some means for dissipating it so that the product will not be effected by excessively high temperatures. One effective means for controlling the heat or reaction consists of suspending the solid polymer in an inert organic liquid such as benzene and bubbling ammonia through the slurry.

In preparing the presently provided fine grain, highly photo sensitive dispersions of silver bromide, I operate substantially as follows:

I prepare an aqueous solution of the copolymer compound and a water-soluble bromide in known concentrations and gradually add thereto an aqueous solution of a silver salt with agitation or stirring. Alternatively, I may first prepare an aqueous solution of the copolymer and simultaneously add thereto the water-soluble halide and silver salt. The concentration of the copolymer in the aqueous solution is immaterial; however, sufficient quantity of the copolymer should be present in the reaction mixture to assure dispersion of the silver halide as it is formed. Because the present copolymers display pronounced silver halide dispersing activity at very small concentrations, advantageously, very dilute aqueous solutions of the copolymer are employed. The concentration of the copolymer in the aqueous dispersion of the silver halide thus prepared is in the order of, say, from 0.001% to 0.1% of copolymer based on the total weight of the dispersion. Employing the copolymer in such concentrations, there are obtained crystals of the silver halide which are of considerably less than one micron, e.g., from 0.1–0.5 micron. The dispersions or suspensions of silver halide thus obtained have pronounced stability, as compared to those obtained in the absence of the copolymer. Thus while the settling time of silver bromide suspensions obtained in the absence of a dispersant is generally from, say, only a few minutes to an hour, sedimentation in silver halide dispersions prepared according to the present process is not evident until a considerably longer length of time has elapsed and complete settling of the precipitated halide does not occur until a time of from, say, several days to several weeks.

The effect of the presently employed copolymer dispersant on the light sensitivity of silver halides prepared in the presence of these dispersants is readily noted in experiments wherein silver halide formation is effected in the presence of daylight or ultraviolet light. In dilute solutions of the silver halide, the effect of the copolymer on the light sensitivity is revealed by pink to violet-brown discolorations of the microscopic particles within a few minutes and the discoloration deepens with time without readily visible precipitation of the silver bromide. When the salt ions are more concentrated, the silver halide is visibly dispersed as it is formed and the dispersions thus obtained turn black within one or two minutes. On the other hand, silver halides which are obtained by use of the same ion concentrations but in the absence of the copolymer dispersant, remain substantially colorless for several hours.

Aqueous dispersions prepared substantially as above described in the presence of the $C_2$–$C_4$ aliphatic olefin-maleic acid copolymer compounds are generally useful in the preparation of photographic emulsions. As the protective carrier component of the emulsion there may be employed either gelatin or any of the customarily used substantially water-soluble synthetic resinous materials such as polyvinyl alcohol, partially hydrolyzed polyvinyl acetals or esters, low viscosity polyvinyl esters, etc. The emulsions, prepared in accordance with the invention, upon application to a supporting material such as film or paper, give a photographic product which is characterized by high sensitivity and very fine grain structure.

The invention is further illustrated, but not limited, by the following examples:

*Example 1*

The half-amide half-salt of an isobutylene-maleic acid copolymer (prepared by ammoniating a maleic acid-isobutylene copolymer having an average molecular weight of about 150,000) was dissolved in sufficient water to give an 0.025 N solution thereof. It was further diluted to give 0.0125 N and 0.0063 N solutions of said half-amide half-salt. The 0.0125 N solution was mixed with 5 ml. of 0.1 N aqueous sodium bromide, and 5 ml. of 0.1 N aqueous silver nitrate was gradually added, with stirring, to the resulting mixture. To 2.5 ml. of the 0.0063 N solution of copolymer, there was added 7.5 ml. of water and 5 ml. of the 0.1 N aqueous sodium bromide, and the resulting mixture was treated with 5 ml. of 0.1 N aqueous silver nitrate, also gradually and with stirring. A "blank" was prepared by adding 5 ml. of 0.1 N aqueous sodium bromide to 10 ml. of water and gradually adding thereto, with stirring, 5 ml. of 0.1 N silver nitrate. Upon addition of the silver nitrate, all of the mixtures became cloudy with suspended silver bromide; but that prepared in the absence of the copolymer half-amide half-salt began to settle almost immediately with complete sedimentation within an hour, whereas the other two dispersions of the silver bromide remained at least partially suspended at the end of 48 hours, and complete sedimentation had not occurred even at the end of 6 days. Inspection of the silver bromide particles present in the dispersions, disclosed a particle size of over two microns in the case of the "blank," whereas a particle size of less than one micron was determined for the silver bromide crystals obtained in the presence of the copolymer dispersant.

*Example 2*

An ethylene-maleic anhydride copolymer having a specific viscosity of 0.09 (as determined for a 1% by weight solution thereof in dimethylformamide) was mixed with 500 ml. of distilled water to give an ethylene-maleic acid copolymer solution having an 0.025 N concentration of free acid. Dispersions of silver bromide were prepared by gradually adding, with stirring, 5 ml. of 0.1 N silver nitrate to a mixture consisting of 5 ml. of the 0.025 N copolymer solution, 5 ml. of 0.1 N sodium bromide and 5 ml. of water for the preparation of one dispersion; and, for the preparation of another dispersion, by gradually adding, with stirring, 5 ml. of 0.1 N silver nitrate to a mixture consisting of 10 ml. of the 0.025 N copolymer solution and 5 ml. of the 0.1 N aqueous sodium bromide. The resulting aqueous dispersions of the silver bromide were still cloudy at the end of 16 hours and complete settling was not observed even after 5 days.

*Example 3*

The maleic anhydride copolymer of Example 2 was converted to the sodium salt by treating it with aqueous sodium hydroxide to obtain an 0.025 N aqueous solution of the sodium salt of the ethylene-maleic anhydride copolymer.

Silver bromide dispersions were prepared by adding 5 ml. of 0.1 N silver nitrate to a mixture consisting of 5 ml. of the 0.025 N copolymer salt solution, 5 ml. of 0.1 N aqueous sodium bromide and 5 ml. of water in one instance; and, in another instance, by gradually adding, with stirring, 5 ml. of 0.1 N silver nitrate to a mixture consisting of 10 ml. of the 0.025 N copolymer salt solution and 5 ml. of 0.1 N sodium bromide. The aqueous dispersions of silver bromide thus obtained were of marked stability, the settling time thereof being several hours rather than a few minutes as was the case with dispersions prepared from the same quantities of sodium bromide, silver nitrate and water in the absence of the copolymer dispersant.

*Example 4*

This example shows that the molecular weight of ethylenemaleic anhydride copolymer has substantially no effect on the nature of silver bromide dispersions obtained in the presence thereof. The effect of various concentrations of the copolymer is also shown. In the table below, there are employed the ethylene-maleic acid copolymers prepared by dissolving in water either (A) an ethylene-maleic anhydride copolymer having a specific viscosity of 0.09 or (B) an ethylene-maleic anhydride copolymer having a specific viscosity of 1.11, as determined for respective 1.0% by weight solutions thereof in dimethylformamide.

| Expt. No. | 0.1 N NaBr, ml. | 0.1 N AgNO$_3$, ml. | H$_2$O, ml. | Copolymer |
|---|---|---|---|---|
| I | 5 | 5 | 0 | 10 ml. 0.05 N of A. |
| II | 5 | 5 | 0 | 10 ml. 0.005 N of B. |
| III | 5 | 5 | 4 | 6 ml. 0.005 N of A. |
| IV | 5 | 5 | 4 | 6 ml. 0.005 N of B. |
| V | 5 | 5 | 8 | 2 ml. 0.005 N of A. |
| VI | 5 | 5 | 8 | 2 ml. 0.005 N of B. |
| VII | 5 | 5 | 10 | None. |
| VIII | 5 | 5 | 8 | 2 ml. 0.0005 N of A. |

In the above table, the normality of the copolymer solution is calculated as the free acid. The respective experiments were conducted by adding the silver nitrate to a mixture of the sodium bromide and copolymer solution in the presence or absence of additional water as indicated. In Experiment VII, wherein no copolymer was present, complete settling-out of the silver bromide within one hour was noted. In Experiment VIII, wherein a concentration of about 30 p.p.m. of the copolymer, based on the total weight of the dispersion, was employed, the settling-out time was considerably prolonged but did not attain the time noted in the other experiments, which time generally was from several hours to a day. The molecular weight of the ethylene-maleic anhydride copolymer thus has no marked effect on the dispersing effect of the free acid obtained therefrom although stability of the suspensions was found to be a function of the quantity of the copolymer dispersant employed, dispersing effect is noted when the copolymer is present in only very small proportions.

*Example 5*

This example shows the effect on light sensitivity of the half-amide half-ammonium salt of isobutylene-maleic anhydride copolymer half-amide half-salt of Example 1 when employed in the preparation of silver bromide in daylight.

To a mixture consisting of 5 ml. of an 0.025 N aqueous solution of the half-amide half-salt, 5 ml. of 0.005 N sodium bromide and 5 ml. of water, there was gradually added, with stirring, 5 ml. of 0.005 N aqueous silver nitrate. A "blank" was also prepared by adding 5 ml. of 0.005 N silver nitrate to a mixture consisting of 5 ml. of 0.005 N aqueous sodium bromide and 10 ml. of water.

The reaction mixture obtained in the presence of the copolymer half-amide half-salt became pink within an hour, whereas the "blank" showed no discoloration.

In another set of experiments, wherein an excess of silver nitrate was employed, 6 ml. of 0.005 N aqueous silver nitrate was gradually added, with stirring, to a mixture consisting of 5 ml. of the 0.025 N aqueous copolymer half-amide half-salt, 5 ml. of 0.05 N sodium bromide and 4 ml. of water. A "blank" was prepared by adding 6 ml. of silver nitrate of the same normality to a mixture consisting of 5 ml. of the same normality of sodium bromide and 9 ml. of water. The reaction mixture which was obtained in the presence of the copolymer half-amide half-salt turned pink within about 30 minutes, whereas no discoloration was evidenced in the case of the "blank."

In still another set of experiments, the effect of the use of more concentrated silver nitrate and sodium bromide was studied. To a mixture consisting of 5 ml. of 0.025 N aqueous solution of said copolymer half-amide half-salt, 5 ml. of 0.1 N aqueous sodium bromide and 4 ml. of water, there was gradually added, with stirring, 6 ml. of 0.1 N silver nitrate. A "blank" was prepared by adding 6 ml. of silver nitrate of the same normality to a mixture consisting of 5 ml. of the same normality of sodium bromide and 9 ml. of water. The reaction mixture which was prepared in the presence of the copolymer half-amide half-salt turned a reddish-purple at the end of about 10 minutes, whereas the "blank," of a milky, chalky color, showed no discoloration.

Even more highly concentrated solutions of sodium bromide and silver nitrate were employed in a subsequent experiment. To 5 ml. of the 0.025 N aqueous copolymer half-amide half-salt, 5 ml. of 2 N aqueous sodium bromide and 5 ml. of water, there was gradually added, with stirring, 5 ml. of 2 N aqueous silver nitrate; and a "blank" was prepared by adding 5 ml. of 2 N aqueous silver nitrate to a mixture consisting of 5 ml. of 2 N aqueous sodium bromide and 10 ml. of water. Within a few minutes the reaction mixture which was prepared in the presence of the copolymer half-amide half-salt began to turn black, whereas no color change was perceptible in the "blank."

*Example 6*

An 0.025 N aqueous solution of the sodium salt of ethylene-maleic anhydride was prepared by reacting with sodium hydroxide an ethylene-maleic anhydride copolymer having a specific viscosity of 1.11 as determined for a 1.0% solution thereof in dimethylformamide. The effect of the resulting solution on the light sensitivity of silver bromide prepared in the presence thereof was studied by gradually adding, with stirring, 5 ml. of 2 N aqueous silver nitrate to a mixture consisting of 5 ml. of 2 N aqueous sodium bromide, 5 ml. of water and 5 ml. of said ethylene-maleic anhydride salt solution. The resulting reaction mixture began to darken in about 10 minutes.

*Example 7*

This example shows the effect of ethylene-maleic anhydride copolymer on the light sensitivity of silver bromide prepared in the presence thereof. An ethylene-maleic anhydride copolymer having a specific viscosity of 1.11 as determined for a 1.0% solution thereof in dimethylformamide, was added to distilled water in a quantity calculated to give an 0.025 N aqueous solution of the free acid. To a mixture consisting of 5 ml. of said free acid solution, 5 ml. of water and 5 ml. of 2 N aqueous sodium bromide, there was gradually added, with stirring, 5 ml. of 2 N aqueous silver nitrate. Darkening of the resulting reaction mixture was observed within 5 minutes.

Example 8

This example shows the effect on light sensitivity of silver bromide prepared in the presence of the half-amide half-salt of ethylene-maleic anhydride copolymer prepared by ammoniating an ethylene-maleic anhydride copolymer having a specific viscosity of 0.1 as determined for an 0.10% by weight solution thereof in dimethylformamide. To a mixture consisting of 5 ml. of an 0.025 N aqueous solution of the half-amide half-salt, 5 ml. of 2 N aqueous sodium bromide and 5 ml. of water, there was gradually added, with stirring, 5 ml. of 2 N aqueous silver nitrate. The resulting reaction mixture began to darken within 5 minutes and was black at the end of 50 minutes.

Example 9

To a mixture consisting of 20 ml. of 0.025 N aqueous solution of the half-amide, half-ammonium salt of isobutylene-maleic acid copolymer described in Example 1, 19.5 ml. of 2 N aqueous potassium bromide, 0.5 ml. of 2 N aqueous potassium iodide and 20 ml. of water, there was gradually added, with vigorous stirring, 20 ml. of 2 N aqueous silver nitrate. The resulting silver halide dispersion was mixed with 100 ml. of a 10% aqueous solution of polyvinyl alcohol. The whole was then diluted with water to give a composition having a viscosity suitable for smooth application to paper, and subsequently sensitized with 2,3'-diethyl-4'-methyloxathiazolocarbocyanine iodide. Photographic paper prepared from the resulting emulsion by applying it to paper and drying gave a readily processed product.

As will be apparent to those skilled in the art, all of the above experiments, except those in which the effect of daylight was studied (Examples 5–8) were carried out in the dark in order to avoid deterioration to the silver halide.

The present $C_2$—$C_4$ aliphatic olefin-maleic acid copolymers and amides and salts thereof are also effective in preparing aqueous dispersions of other silver halides, i.e., silver chloride and silver iodide; and, as with silver bromide there are thereby obtained similarly fine grain products having improved light-sensitivity. For numerous purposes aqueous dispersions of mixtures of the silver halide are desirable. These can be prepared, according to the invention, by precipitating a mixture of halides in water solution by treatment with a silver salt in presence of present copolymer dispersants. Thus, aqueous solutions of substantially equal quantities of, say, potassium bromide and potassium chloride and a minor amount of potassium iodide when treated with aqueous silver nitrate in the presence of, say, the half-amide, half ammonium salt of ethylene-maleic anhydride copolymer yields a dispersion of a mixture of very fine grained silver halides of remarkable photosensitivity. Such dispersions are readily sensitized by the usual sensitizing dyes, e.g., the cyanine dyes.

As will be apparent to those skilled in the art, many variations may be made in preparing the present dispersions. For example, instead of adding the solution of silver salt to the mixture of water-soluble halide, copolymer dispersant and water, the dispersant may be introduced into the solution of silver salt, and the resulting mixture added to the aqueous solution of halide. Or, if desired, aqueous solutions of halide may be added either simultaneously or alternatively to water containing the copolymer dispersant. Formation of the water-insoluble silver salt can also be conducted in the presence of the protective carrier therefor which it is desired to employ as a constituent of the photographic emulsion. Here the aqueous solution of silver salt is added to an aqueous mixture consisting of the present copolymer dispersant, water-soluble halide and the carrier, e.g., polyvinyl alcohol, gelatin, partially hydrolyzed polyvinyl acetate or polyvinyl butyral, cellulose nitrate, etc. If not water-soluble, the carrier is employed as a solution in a water-miscible solvent.

What I claim is:

1. A photographic emulsion comprising a silver halide of small particle size prepared by a double decomposition reaction in water between a water-soluble halide and a water-soluble silver salt in the presence of from 0.001% to 0.1% based on the weight of the total reaction mixture of a dispersant which is a copolymer consisting of the repeating unit

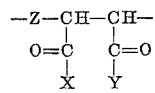

wherein Z is a bivalent alkylene radical of from 2 to 4 carbon atoms and X and Y are selected from the class consisting of the radicals —OH, $ONH_4$, —$NH_2$ and alkali metal, and a protective carrier for said silver halide which is selected from the class consisting of gelatin, polyvinyl alcohol, water soluble partially hydrolyzed polyvinyl acetals and esters, and water-soluble low viscosity polyvinyl esters.

2. A photographic emulsion comprising a silver halide of small particle size prepared by a double decomposition reaction in water between a water-soluble halide and a water-soluble silver salt in the presence of from 0.001% to 0.1% based on the total weight of the reaction mixture of a dispersant which is a copolymer consisting of the repeating unit

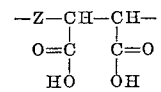

wherein Z is a bivalent alkylene radical of from 2 to 4 carbon atoms and a protective carrier for the silver halide which is selected from the class consisting of gelatin, polyvinyl alcohol, water-soluble partially hydrolyzed polyvinyl acetals and esters, and water-soluble low viscosity polyvinyl esters.

3. A photographic emulsion comprising a silver halide of small particle size prepared by a double decomposition reaction in water between a water-soluble halide and a water-soluble silver salt in the presence of from 0.001% to 0.1% based on the total weight of the reaction mixture of a dispersant which is a copolymer consisting of the repeating unit

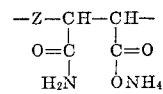

where Z is a bivalent alkylene radical of from 2 to 4 carbon atoms, and a protective carrier for the silver halide which is selected from the class consisting of gelatin, polyvinyl alcohol, water-soluble partially hydrolyzed polyvinyl acetals and esters, and water-soluble low viscosity polyvinyl esters.

4. A photographic emulsion comprising a silver bromide of small particle size prepared by a double decomposition reaction in water between sodium bromide and silver nitrate in the presence of from 0.001% to 0.1% based on the weight of the total reaction mixture of a dispersant which is a copolymer consisting of the repeating unit

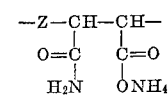

wherein Z is a bivalent alkylene radical of from 2 to 4 carbon atoms, and gelatin as a protective carrier for the silver halide.

5. A photographic emulsion comprising a silver bromide of small particle size prepared by a double decomposition reaction in water between sodium bromide and silver nitrate in the presence of from 0.001% to 0.1% based on the weight of the total reaction mixture of an ethylene-maleic acid copolymer as a dispersant, and gelatin as a protective carrier for the silver bromide.

6. A photographic emulsion comprising a silver bromide of small particle size prepared by a double decomposition reaction in water between sodium bromide and silver nitrate in the presence of from 0.001% to 0.1% based on the weight of the total reaction mixture of the half-amide, half-ammonium salt of isobutylene-maleic acid copolymer, and gelatin as a protective carrier for the silver bromide.

7. The process of preparing a photographic emulsion which comprises first preparing an aqueous dispersion of a silver halide of small particle size by conducting in water a double decomposition reaction between a water-soluble halide and a water-soluble silver salt in the presence of from 0.001% to 0.1%, based on the weight of the total reaction mixture, of a dispersant which is a copolymer consisting of the repeating unit

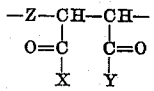

wherein Z is a bivalent alkylene radical of from 2 to 4 carbon atoms and X and Y are selected from the class consisting of the radicals —OH, ONH$_4$, —NH$_2$ and alkali metal, and subsequently adding thereto, as a protective carrier for the silver halide, a polymeric material selected from the class consisting of gelatin, polyvinyl alcohol, water-soluble partially hydrolyzed polyvinyl acetals and esters, and water-soluble low viscosity polyvinyl esters.

8. The process of preparing a photographic emulsion which comprises preparing an aqueous dispersion of a silver halide of small particle size by conducting in water a double decomposition reaction between a water-soluble halide and a water-soluble silver salt in the presence of from 0.001% to 0.1%, based on the weight of the total reaction mixture, of a dispersant which is a copolymer consisting of the repeating unit

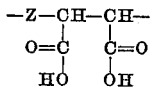

wherein Z is a bivalent alkylene radical of from 2 to 4 carbon atoms, and subsequently adding thereto, as a protective carrier for the silver halide, a polymeric material selected from the class consisting of gelatin, polyvinyl alcohol, water-soluble partially hydrolyzed polyvinyl acetals and esters, and water-soluble low viscosity polyvinyl esters.

9. The process of preparing a photographic emulsion which comprises preparing an aqueous dispersion of a silver halide of small particle size by conducting in water a double decomposition reaction between a water-soluble halide and a water-soluble silver salt in the presence of from 0.001% to 0.1%, based on the weight of the total reaction mixture, of a dispersant which is a copolymer consisting of the repeating unit

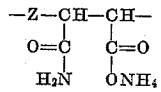

wherein Z is a bivalent alkylene radical of from 2 to 4 carbon atoms, and subsequently adding thereto, as a protective carrier for the silver halide, a polymeric material selected from the class consisting of gelatin, polyvinyl alcohol, water-soluble partially hydrolyzed polyvinyl acetals and esters, and water-soluble low viscosity polyvinyl esters.

10. The process of preparing a photographic emulsion which comprises preparing an aqueous dispersion of silver bromide of small particle size by contacting in water a double decomposition reaction between sodium bromide and silver nitrate in the presence of from 0.001% to 0.1%, based on the total weight of the reaction mixture, of ethylene maleic acid copolymer as dispersant, and subsequently adding gelatin thereto as a protective carrier for the silver bromide.

11. The process of preparing a photographic emulsion which comprises preparing an aqueous dispersion of silver bromide of small particle size by contacting in water a double decomposition reaction between sodium bromide and silver nitrate in the presence of from 0.001% to 0.1%, based on the total weight of the reaction mixture, of the half-amide, half-ammonium salt of isobutylene-maleic acid copolymer, and subsequently adding galatin thereto as a protective carrier for the silver bromide.

References Cited in the file of this patent
UNITED STATES PATENTS

| | | |
|---|---|---|
| 1,981,102 | Hagedorn et al. | Nov. 20, 1934 |
| 2,006,002 | Schneider | June 25, 1935 |
| 2,276,323 | Lowe | Mar. 17, 1942 |
| 2,378,629 | Hanford | June 19, 1945 |
| 2,712,003 | Bowen | June 28, 1955 |
| 2,823,200 | Longley | Feb. 11, 1958 |

FOREIGN PATENTS

| | | |
|---|---|---|
| 645,625 | Germany | June 23, 1937 |

UNITED STATES PATENT OFFICE

CERTIFICATION OF CORRECTION

Patent No. 2,957,767                      October 25, 1960

Forrest V. Williams

It is hereby certified that error appears in the above numbered patent requiring correction and that the said Letters Patent should read as corrected below.

Column 1, line 24, for "holide" read -- halide --; line 50, for "alkali" read -- -O-alkali --; column 3, line 25, for "or" read -- of --; column 5, lines 19 and 20, for "ethylenemaleic" read -- ethylene-maleic --; lines 57 and 58, for "therefrom although" read -- therefrom. Although --; column 8, line 17, for "alkali" read -- -O-alkali --; column 9, lines 26 and 27, for "alkali" read -- -O-alkali --.

Signed and sealed this 11th day of July 1961.

(SEAL)
Attest:

ERNEST W. SWIDER
Attesting Officer

DAVID L. LADD
Commissioner of Patents